Sept. 30, 1952     W. J. COLLINS     2,612,139
CAT COLLAR
Filed July 19, 1947
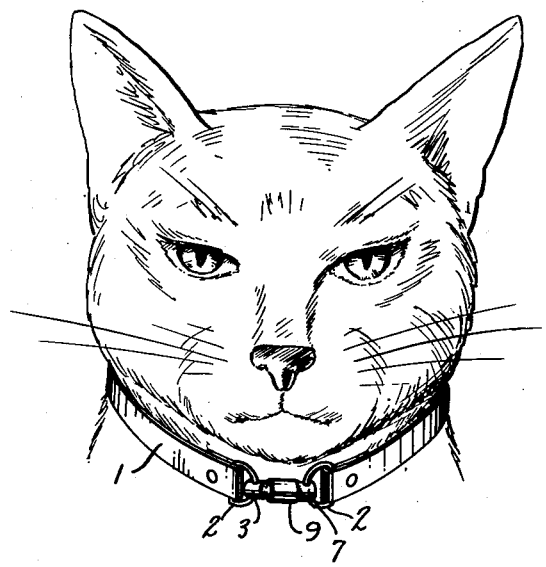
Fig. 1
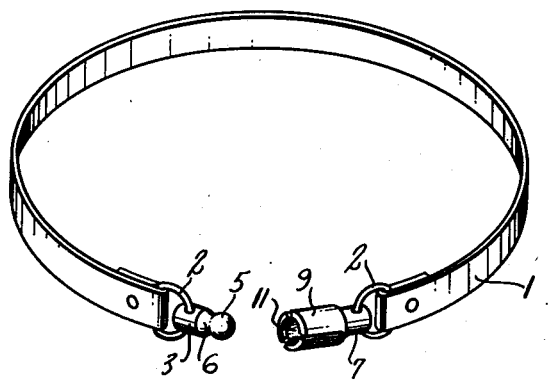
Fig. 2
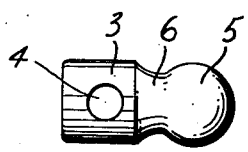  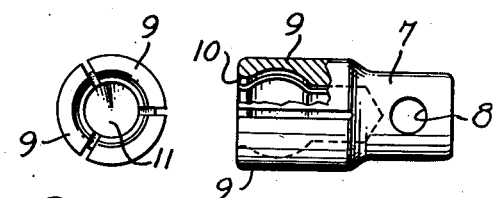
Fig. 3.    Fig. 4.    Fig. 5.    Fig. 6.
INVENTOR.
WILLIAM J. COLLINS
BY
Reynolds, Beach & Christensen
ATTORNEYS Patented Sept. 30, 1952

2,612,139

UNITED STATES PATENT OFFICE 2,612,139

CAT COLLAR

William Joseph Collins, Seattle, Wash.

Application July 19, 1947, Serial No. 762,069

1 Claim. (Cl. 119—106)

The present invention relates to a cat collar and particularly to one which may be worn by treasured cat pets or prize cats without fear by the owner that the collar may be caught on brush in the woods or some projection, either to strangle the cat in case it should fall, or should exert itself excessively in attempting to free itself, or should twist the collar. On the contrary, it is an object of the present invention to provide such a collar which will be readily releasable by either circumferential stress in excess of a predetermined value, or radial stress in excess of a predetermined value, at any point, or both.

A further object is to provide such a cat collar having a releasable connector, which is of rugged construction, cannot be bent out of shape easily and will retain accurately and unchanging its resilience of predetermined value despite wear or abuse which may occur during use.

Further advantages of the preferred construction shown in the accompanying drawings will be pointed out in the following detailed description.

Figure 1 is a top perspective view showing the collar in place about a cat's neck.

Figure 2 is a top perspective view of the collar with the cooperating portions of the fastener disposed in adjacent relationship but disconnected.

Figure 3 is an enlarged side view of the ball element of the fastener and Figure 4 is an end view of such element.

Figure 5 is an enlarged end view of the socket element of the fastener, and Figure 6 is a side view of such element with a portion of the side wall broken away.

The neck-encircling member may be of any size, shape or character of limp material, being illustrated as the strap 1 carrying at each end the D-ring 2, on which rings elements of the fastener or clasp are mounted.

The most important feature of the collar is the clasp, which is not intended simply as convenient means for securing together the ends of the collar, although it does serve this purpose also, but primarily constitutes a safety release or disconnectible coupling which will part to free the cat of the collar in the event that it should become caught and the cat should make a reasonably vigorous effort to pull free, or the weight of the cat or a large part of it should stress the collar.

It is evident that the collar may be slid circumferentially around the neck of the cat so that the clasp may be located in any position around the cat's neck. Also, it is evident that almost any part of the collar may be snagged, although the sides and back are most susceptible. To constitute an absolutely reliable safety release under every conceivable circumstance, therefore, the clasp design is of great importance.

If a radial stress is exerted on the collar at a location substantially diametrically opposite the clasp, such stress will exert a circumferential tension force on the clasp side of the collar so that the clasp parts must be releasable in that instance by direct circumferential stress. On the contrary, if a radial pull should be exerted on the collar at the clasp, it would be subjected to substantially a pure bending stress and in such event must be reliably releasable by a moderate bending stress on or relative tilting of the clasp parts.

Not only must a satisfactory safety clasp for a cat collar be disconnectible by moderate stresses of the types mentioned, but it must not be subject to failure because of the collection of dirt in the clasp or corrosion of the parts which may result from dampness.

A further requirement of such a safety clasp is that it be capable of being released by virtually the same design overload stress whether exerted when the clasp is new or after it has been in use for a long time. Moreover, the clasp should not become appreciably easier to open after use, creating the possibility unnecessarily of accidental loss of the collar when its removal is not required to free the cat in an emergency situation.

A clasp found to meet all of these exacting requirements may be of the ball and socket type as shown in the drawings, including the generally cylindrical ball element 3 having the aperture 4 in one end through which one of the D-rings 2 extends. Such ball element includes the knob 5 at least substantially as wide as the greatest width of the ball element transversely of the strap and of substantially spherical shape carried by a relatively thin neck or shank 6, so that the knob projects lengthwise of the strap away from its end.

The generally cylindrical socket element 7 also has an aperture 8 through one end for receiving the other D-ring. This element includes at least three independently yieldable, resilient, elongated fingers 9 extending lengthwise of the strap 1 away from its end to which the socket element is connected. Each of these fingers has a projection 10 on its inner side adjacent to its free end with which the knob 5 is wedgingly engageable as the ball and socket elements are moved relatively toward each other. The projections on these fingers further define a restricted entrance to the socket cavity 11 inwardly of them, into which the knob may be pressed, so that these projections will be snapped behind the knob received in the socket by the resilience of the fingers to lie adjacent to the neck 6 of the ball element. As a direct separating pull is exerted on the clasp elements, therefore, the back of the knob adjacent to the neck will exert a wedging force on the projections 10 to spring the fingers apart sufficiently to release the knob when the stress exceeds a predetermined value.

If a radial force is exerted on the collar at the location of the clasp, the bending stress thus produced will tilt the ball element 3 and the socket element 7 relative to each other until the end of a finger or of two adjacent fingers 9 bear on the neck 6, whereupon the back of the knob adjacent to the neck again will come into wedging engagement with one or more projections 10 of the fingers to spread them apart sufficiently so that the knob will be released from the socket. Because the socket element is composed of at least three resilient fingers, such releasing wedging action of the knob on the socket fingers will occur in whatever direction the ball and socket elements may be tilted relatively.

In order to enable the ball and socket elements to be released reliably by wedging engagement of the knob with the projections on the fingers as described, whether the stress exerted on the clasp simply effects relative tilting of its elements, pure circumferential stress on them, or a combination of the two, it is important that the length of each finger 9 or the slits between them be of considerable length, such length as shown in the drawings being substantially greater than the width of the knob 5 transversely of the strap and substantially greater than the width of a finger. Not only does such finger length insure reliable release of the clasp under all possible combinations of stress as discussed above, but it insures that such release will occur under generally equal conditions of stress whether such stress is exerted adjacent to the clasp to produce principally a radial load on it to effect relative tilting of its elements, or at a location remote from the clasp so that pure circumferential stress will be produced on it, or at some intermediate location. Fingers of such length also enable the separation of the ball and socket elements to be effected by very moderate unusual loads on the collar, such as would be produced by a cat exerting a reasonable effort to attempt to free its collar, but at the same time will provide a firm and reliable grip on the knob so that the collar will not readily become unfastened accidentally.

I claim as my invention:

A cat collar comprising a limp neck-encircling member, a ball element carried by one end of said neck-encircling member and including a knob at least substantially as wide as the greatest width of said ball element transversely of said neck-encircling member, carried by a relatively thin shank and projecting lengthwise of said neck-encircling member away from such end, and a socket element carried by the other end of said neck-encircling member, opening lengthwise of said neck-encircling member away from such end, and including at least three independently yieldable, resilient elongated fingers forming its open end, each finger being of a length substantially greater than the width of said knob transversely of said neck-encircling member and each of a length substantially greater than its width, said fingers having projections on their inner sides adjacent to their free ends together defining a restricted entrance to a knob-receiving socket inwardly thereof and wedgingly engageable by said knob to spring said fingers outwardly for reception of said projections behind said knob when moved into said socket, and said projections being wedgingly engageable by the back of said knob in said socket upon excessive relative tilting of said ball element and said socket element in any direction or movement of said knob outwardly of said socket effected by stress on said neck-encircling member circumferentially thereof sufficient to overcome the resilience of said fingers.

WILLIAM JOSEPH COLLINS.

REFERENCES CITED

The following references are of record in the file of this patent:

UNITED STATES PATENTS

| Number | Name | Date |
| --- | --- | --- |
| 122,020 | Hughs et al. | Dec. 19, 1871 |
| 289,531 | Harrington | Dec. 4, 1883 |
| 534,380 | Smith | Feb. 19, 1895 |
| 771,912 | Kahl | Oct. 11, 1904 |
| 839,047 | Sylvester | Dec. 18, 1906 |
| 1,020,242 | Wilson | Mar. 12, 1912 |
| 1,273,100 | Smith | July 16, 1918 |
| 1,288,317 | Warburg | Dec. 17, 1918 |
| 1,796,775 | Warren | Mar. 17, 1931 |
| 1,829,857 | Fisher | Nov. 3, 1931 |
| 2,439,000 | Hasenzahl | Apr. 6, 1938 |

FOREIGN PATENTS

| Number | Country | Date |
| --- | --- | --- |
| 20,868 | Great Britain | 1912 |
| 436,033 | Germany | Oct. 22, 1926 |